US008378021B2

(12) United States Patent
Schultes et al.

(10) Patent No.: US 8,378,021 B2
(45) Date of Patent: Feb. 19, 2013

(54) METHODS OF MAKING A OPAQUELY DARK COLORED MOLDING COMPOSITION (75) Inventors: Klaus Schultes, Wiesbaden (DE); Ernst Becker, Bensheim (DE); Ursula Golchert, Dieburg (DE); Elisabeth Clamer, Darmstadt (DE)

(73) Assignee: Evonik Röhm GmbH, Darmstadt (DE)

( * ) Notice: Subject to any disclaimer, the term of this patent is extended or adjusted under 35 U.S.C. 154(b) by 371 days.

(21) Appl. No.: 11/720,653

(22) PCT Filed: Oct. 25, 2005

(86) PCT No.: PCT/EP2005/011408
§ 371 (c)(1),
(2), (4) Date: Jun. 1, 2007

(87) PCT Pub. No.: WO2006/058584
PCT Pub. Date: Jun. 8, 2006

(65) Prior Publication Data
US 2009/0176928 A1    Jul. 9, 2009

(51) Int. Cl.
C08F 2/44 (2006.01)

(52) U.S. Cl. ........ 524/785; 524/407; 524/430; 524/435; 524/521; 524/779; 524/780

(58) Field of Classification Search .................. 427/256, 427/407.1; 524/407, 413, 431, 521, 779, 524/785, 430, 435, 780
See application file for complete search history.

(56) References Cited

U.S. PATENT DOCUMENTS

| | | | |
|---|---|---|---|
| 3,468,828 A * | 9/1969 | Perrins et al. ................. 523/333 |
| 4,090,773 A * | 5/1978 | Bauer et al. ................... 359/359 |
| 4,189,520 A | 2/1980 | Gauchel | |
| 4,546,045 A * | 10/1985 | Elias ........................... 428/424.6 |
| 4,833,221 A | 5/1989 | Albrecht | |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,530,080 A | 6/1996 | Siol et al. | |
| 5,548,033 A | 8/1996 | Vetter et al. | |
| 5,576,377 A * | 11/1996 | El Sayed et al. ............. 524/495 |
| 5,612,417 A | 3/1997 | Rhein et al. | |
| 5,652,316 A | 7/1997 | May et al. | |
| 5,705,189 A | 1/1998 | Lehmann et al. | |
| 5,726,245 A | 3/1998 | Numrich et al. | |
| 6,040,387 A | 3/2000 | Albrecht et al. | |
| 6,214,942 B1 | 4/2001 | Siol et al. | |
| 6,287,470 B1 | 9/2001 | Vetter et al. | |
| 6,355,712 B1 | 3/2002 | Schultes et al. | |
| 6,576,255 B1 | 6/2003 | Petereit et al. | |
| 6,613,871 B2 | 9/2003 | Hoess et al. | |
| 6,692,824 B2 * | 2/2004 | Benz et al. ................... 428/328 |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,890,993 B2 | 5/2005 | Schultes et al. | |
| 6,998,140 B2 | 2/2006 | Meier et al. | |
| 7,046,952 B2 | 5/2006 | Kurotori et al. | |
| 7,129,285 B2 * | 10/2006 | Scharnke et al. ............. 523/200 |
| 7,179,852 B2 | 2/2007 | Schultes et al. | |
| 7,498,044 B2 | 3/2009 | Petereit et al. | |
| 7,754,317 B2 | 7/2010 | Neuhaeuser et al. | |
| 8,088,847 B2 | 1/2012 | Numrich et al. | |
| 2002/0160042 A1 | 10/2002 | Petereit et al. | |
| 2004/0104501 A1 | 6/2004 | Petereit et al. | |
| 2004/0116567 A1 | 6/2004 | Schmitt et al. | |
| 2005/0065224 A1 | 3/2005 | Menzler et al. | |
| 2005/0080188 A1 | 4/2005 | Schultes et al. | |
| 2005/0267250 A1 | 12/2005 | Theil et al. | |
| 2006/0052515 A1 | 3/2006 | Schultes et al. | |
| 2006/0121248 A1 | 6/2006 | Lorenz et al. | |
| 2006/0147714 A1 | 7/2006 | Schultes et al. | |
| 2006/0175735 A1 | 8/2006 | Hoess et al. | |
| 2006/0281887 A1 | 12/2006 | Petereit et al. | |
| 2007/0055017 A1 | 3/2007 | Schultes et al. | |
| 2007/0066708 A1 | 3/2007 | Goldacker et al. | |
| 2007/0112135 A1 | 5/2007 | Wicker et al. | |
| 2007/0122624 A1 | 5/2007 | Schultes et al. | |
| 2007/0123610 A1 | 5/2007 | Schultes et al. | |
| 2007/0140045 A1 | 6/2007 | Becht et al. | |
| 2007/0222117 A1 | 9/2007 | Hoess et al. | |
| 2007/0276093 A1 | 11/2007 | Schultes et al. | |
| 2008/0242782 A1 | 10/2008 | Hager et al. | |
| 2008/0248298 A1 | 10/2008 | Numrich et al. | |
| 2010/0098907 A1 | 4/2010 | Schultes et al. | |

(Continued)

FOREIGN PATENT DOCUMENTS

| | | |
|---|---|---|
| DE | 27 19 170 | 11/1978 |
| DE | 101 22 315 | 11/2002 |
| EP | 0 548 822 | 6/1993 |
| GB | 1 444 562 | 8/1976 |

OTHER PUBLICATIONS

U.S. Appl. No. 11/748,874, filed May 15, 2007, Schultes, et al.
U.S. Appl. No. 11/813,946, filed Jul. 13, 2007, Schultes, et al.
U.S. Appl. No. 11/817,407, filed Aug. 30, 2007, Hoess, et al.
U.S. Appl. No. 11/913,325, filed Nov. 1, 2007, Schwarz-Barac, et al.
U.S. Appl. No. 60/831,222, filed Jul. 17, 2006, Hager, et al.
U.S. Appl. No. 11/970,190, filed Jan. 7, 2008, Schultes, et al.
U.S. Appl. No. 12/094,277, filed May 20, 2008, Schultes, et al.
U.S. Appl. No. 12/300,408, filed Nov. 11, 2008, Hoess, et al.
U.S. Appl. No. 12/436,809, filed May 7, 2009, Schultes, et al.
U.S. Appl. No. 12/922,627, filed Sep. 14, 2010, Khrenov, et al.
U.S. Appl. No. 13/058,364, filed Feb. 10, 2011, Golchert, et al.
U.S. Appl. No. 13/382,252, filed Jan. 4, 2012, Kluge, et al.

Primary Examiner — David W Wu
Assistant Examiner — Marie Reddick
(74) Attorney, Agent, or Firm — Oblon, Spivak, McClelland, Maier & Neustadt, L.L.P.

(57) ABSTRACT

The invention relates to subduedly colored (brown, gray, black, green), infrared reflecting PMMA compounds which can be applied to other plastic compounds as an IR barrier layer.

11 Claims, 3 Drawing Sheets

U.S. PATENT DOCUMENTS

| | | |
|---|---|---|
| 2010/0098908 A1 | 4/2010 | Schultes et al. |
| 2010/0148401 A1 | 6/2010 | Schultes et al. |
| 2010/0167045 A1 | 7/2010 | Schultes et al. |
| 2010/0174022 A1 | 7/2010 | Schultes et al. |
| 2010/0189983 A1 | 7/2010 | Numrich et al. |
| 2010/0213636 A1 | 8/2010 | Schmidt et al. |
| 2010/0272960 A1 | 10/2010 | Schultes et al. |
| 2011/0009539 A1 | 1/2011 | Goldacker et al. |
| 2011/0218291 A1 | 9/2011 | Schultes et al. |
| 2011/0269883 A1 | 11/2011 | Battenhausen et al. |
| 2011/0290300 A1 | 12/2011 | Battenhausen et al. |
| 2012/0015141 A1 | 1/2012 | Hoess et al. |

* cited by examiner

METHODS OF MAKING A OPAQUELY DARK COLORED MOLDING COMPOSITION

FIELD OF THE INVENTION

The invention relates to opaquely colored, infrared-reflective poly(meth)acrylate molding compositions which can be applied as IR-barrier layer to further plastics moldings.

PRIOR ART

Because PMMA has very good properties, the corresponding molding compositions are, inter alia, processed to give coextruded layers, or processed as outer layers of in-mould-coated parts. These layers serve as outer layer inter alia of foils, of sheets, of profiles and of pipes, of which the main component or backing layer is composed to some extent of other plastics. These plastics, e.g. PVC, polystyrene, polycarbonate, ABS and ASA, have further important properties, such as impact resistance and/or low price.

Examples of applications for these coextrudates or in-mould-coated articles are construction applications, such as drainpipes and window frames; automobile applications, such as roof modules, external and internal protective coverings (panels), spoilers and mirror housings; household and sports applications, e.g. protective coverings on tools, external panels for boats and ski foils.

It is known that opaquely colored poly(meth)acrylate (PMMA) molding compositions can be used for weathering-protection of plastics moldings composed of, for example, polyvinyl chloride (PVC).

The coated plastics molding is then provided with a colorant, such as $TiO_2$, which reflects the IR radiation at the boundary layer of the two plastics moldings and thus prevents excessive heating of the article.

DE 27 19 170 (Dynamit Nobel) describes a process for protection of PVC layers from the effects of sunlight via a layer which has been durably applied to the PVC layer and which has been equipped not only with UV stabilizers but also with IR reflectors. The IR reflectors used comprise bleaching chromate, molybdate red, molybdate orange, chromium oxide green, antimony sulfide, cadmium sulfoselenide, cadmium sulfide, anthraquinone black pigment, anthraquinone dark blue pigment, monoazo pigment or phthalocyanines. Some of these pigments are no longer approved. A PMMA not specified in any further detail is described as material for the outer layer. DE 26 05 325 (Dynamit Nobel) likewise describes a process for protection of PVC surfaces, and the protective layer applied is colored sufficiently opaquely to achieve maximum reflectance in the IR region and minimum permeability in the UV region. The objective is achieved via the use of at least one IR-reflective black pigment or IR-reflective color pigment. For the darker color pigments, no predominantly IR-absorptive pigments are used. The pigment used in the examples comprises titanium dioxide or anthraquinone black in combination with a UV absorber.

WO 00/24817 (Ferro) describes corundum-hematite structures into which oxides of aluminum, of antimony, of bismuth, of boron, of chromium, of cobalt, of gallium, of indium, of iron, of lanthanum, of lithium, of magnesium, of manganese, of molybdenum, of neodymium, of nickel, of niobium, of silicon, or of tin have been bound.

OBJECT

The desire for dark-colored plastic moldings for outdoor applications requires solution of some problems:
the plastics molding must be weather-resistant—irrespective of the coloring there must be good and durable adhesion between outer layer and plastics molding to be coated heating of the plastics moldings via direct sunlight may not exceed a permissible extent. The amount of heating may not become so great that the article expands unacceptably and temperatures above the glass transition temperature of the molding are reached. By way of example, this can cause irreversible warping of a window frame and prevent its subsequent opening the color pigments used must themselves likewise be weathering-resistant, and also toxicologically non-hazardous and inexpensive.

Further objects achieved by the inventive formulation are:
the colored molding compositions are to have good processibility the formulation is to be stable at the processing temperatures.

ACHIEVEMENT OF OBJECT

Figure 1:
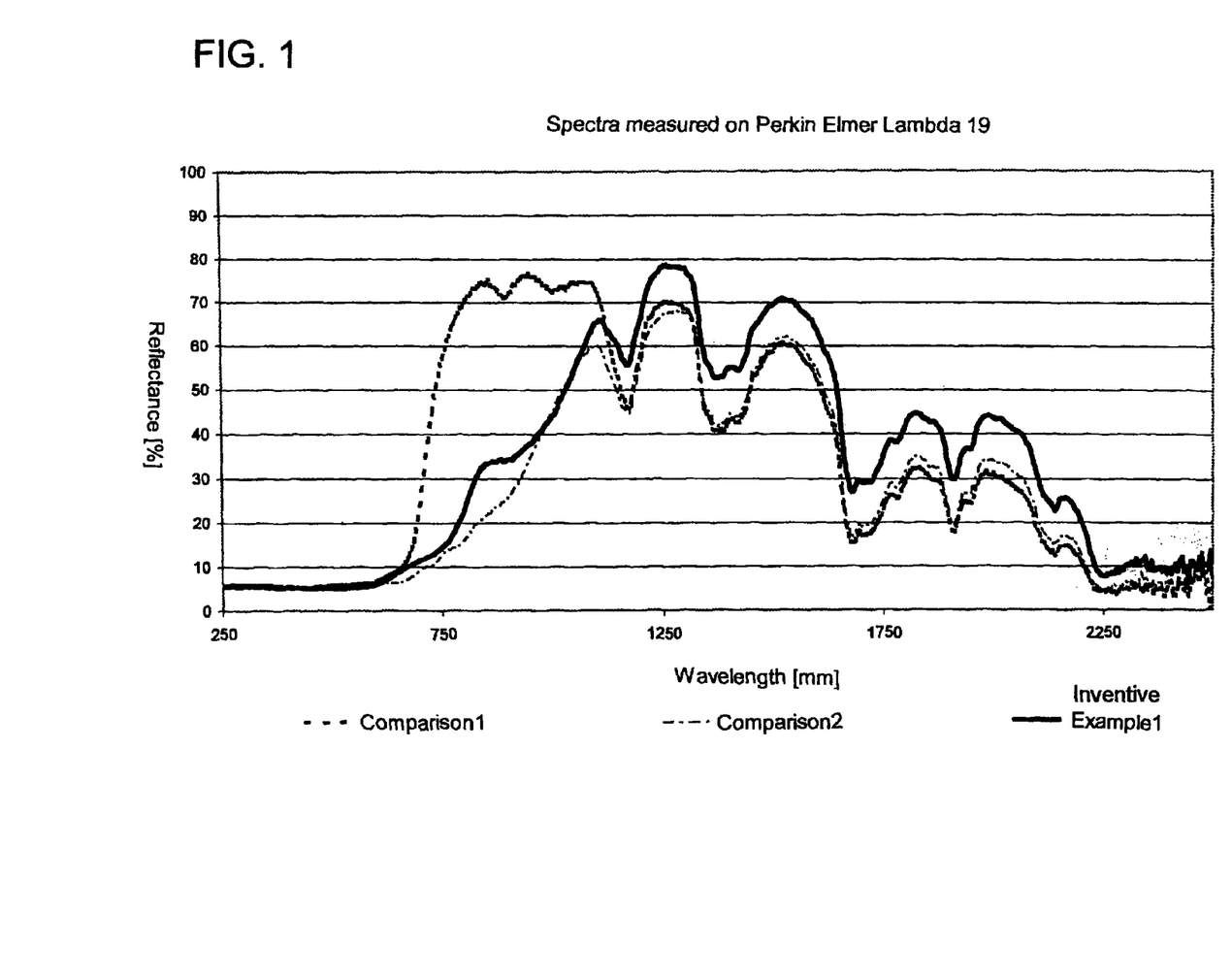
FIG. 1 Spectra for comparative examples 1 and 2 and inventive example 1.
Figure 2:
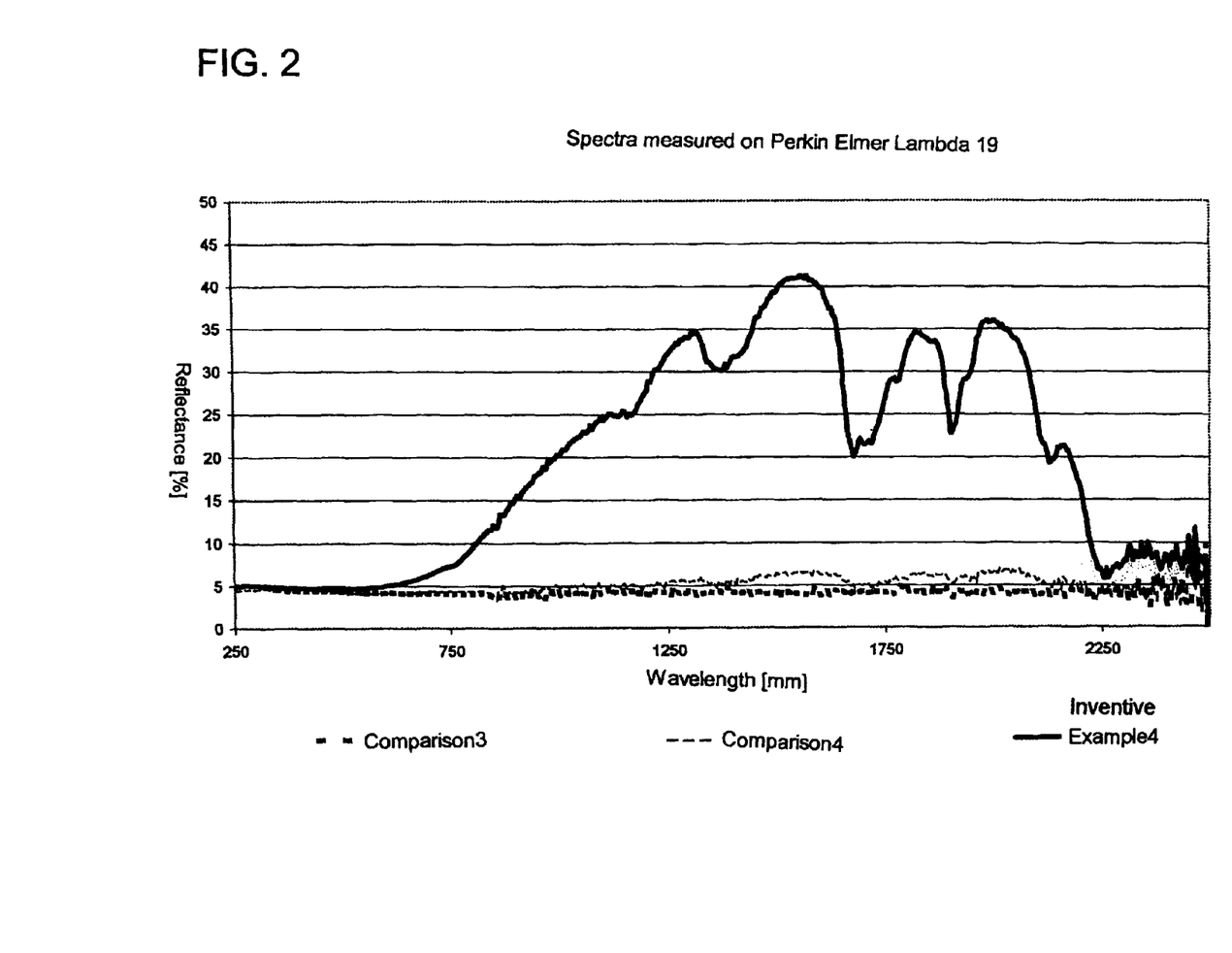
FIG. 2 Spectra for comparative examples 3 and 4 and inventive example 4.
Figure 3:
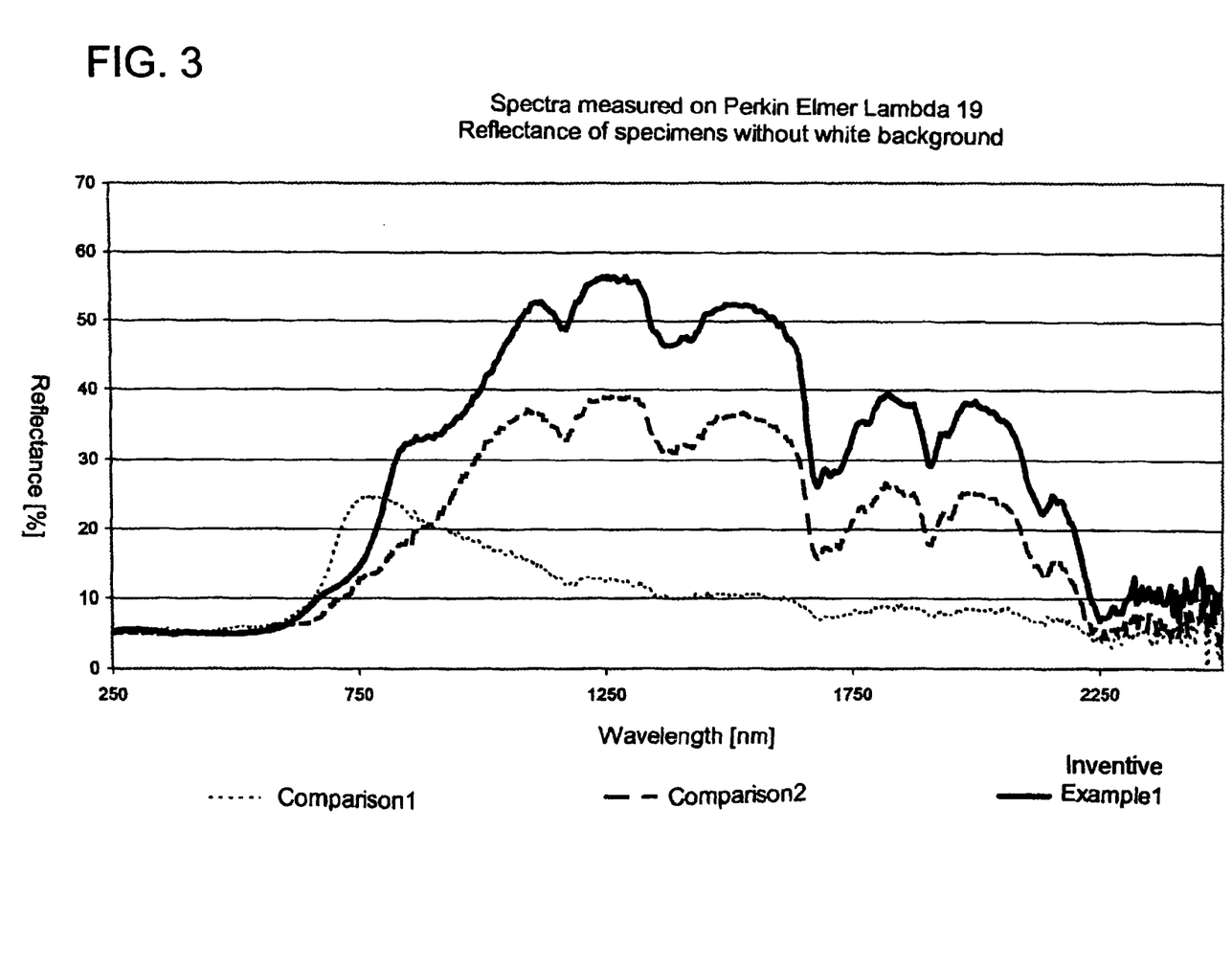
FIG. 3 Spectra for comparative examples 1 and 2 and inventive example 1 without white background.

If various infrared-reflective, inorganic color pigments are used in a PMMA molding composition, these molding compositions can be used to produce dark-colored plastics moldings, and other plastics moldings can be coated with the abovementioned PMMA molding compositions, these having a markedly lower heating rate on insolation than moldings which are composed of conventionally dark-colored PMMA or have been coated with the same.

It has now been found that use of pigments of the following classes as described in Table 1

Table 1. Pigments that do not invoke excessive heating in sunlight in plastic moldings

| CAS Number | C.I. Name | C.I. Number | Chemical name |
|---|---|---|---|
| 68186-85-6 | C.I. Pigment Green 50 | C.I. 77377 | Cobalt titanite green spinel |
| 68909-79-5 | C.I. Pigment Green 17 | C.I. 77288 | Chromium oxide |
| 109414-04-2 | C.I. Pigment Brown 29 | | Chromium iron oxide |
| 68187-09-7 | C.I. Pigment Brown 35 | C.I. 77501 | Iron chromite brown spinel |
| 71631-15-7 | C.I. Pigment Black 30 | C.I. 77504 | Nickel iron chromite black spinel |

C.I. nomenclature according to Colour Index, The Society of Dyers and Colourists (SDC)

in PMMA molding compositions permits preparation of opaquely dark-colored molding compositions without excessive heating in sunlight of the plastics moldings equipped therewith or of moldings produced with these materials. The property "dark" can be defined via the L* value according to DIN 6174 (January 1979): Farbmetrische Bestimmung von Farbabständen bei Körperfarben nach der CieLab-formel [Colourimetric determination of colour differences for mass tone colours by the CieLab formula]. The CieLab L* value for the opaquely dark-colored molding compositions is below 51, preferably below 41 and very particularly preferably below 31.

The amounts of the pigments or of their mixtures incorporated into the molding compositions are from 0.05 to 5.0% by weight, preferably from 0.075 to 3.0% by weight and very particularly preferably from 0.1 to 2% by weight.

Further colorants which are suitable for coloring of PMMA molding compositions may be used additionally to vary the colour. These colorants may be either IR-reflective—e.g. titanium dioxide—or else non-IR-reflective. The proportion of these additional colorants may be from 0 to 3.0%, preferably from 0 to 2.5% by weight and particularly preferably from 0 to 2.0% by weight, based on the molding composition.
Dark colour shades are
brown
gray
green and
black
and mixed shades are also possible.

Examples

The molding composition Plexiglas® 7N is used as PMMA component. It is available commercially from Röhm GmbH & Co. KG.

The molding compositions of the present invention comprise poly(meth)acrylates. The expression (meth)acrylates encompasses methacrylates and acrylates and also mixtures of the two.

Poly(meth)acrylates are known to the person skilled in the art. These polymers are generally obtained via free-radical polymerization of mixtures which comprise (meth)acrylates.

These monomers are well known. Among these monomers are, inter alia, (meth)acrylates which derive from saturated alcohols, e.g. methyl (meth)acrylate, ethyl (meth)acrylate, propyl (meth)acrylate, n-butyl (meth)-acrylate, tert-butyl (meth)acrylate, pentyl
(meth)acrylate and 2-ethylhexyl (meth)acrylate;
(meth)acrylates which derive from unsaturated alcohols, e.g.
    oleyl (meth)acrylate, 2-propynyl (meth)acrylate, allyl (meth)acrylate, vinyl (meth)acrylate;
aryl (meth)acrylates, such as benzyl (meth)acrylate or phenyl (meth)acrylate, where each of the aryl radicals may be unsubstituted or have up to four substituents;
cycloalkyl (meth)acrylates, such as 3-vinylcyclohexyl (meth) acrylate, bornyl (meth)acrylate;
hydroxyalkyl (meth)acrylates, such as
3-hydroxypropyl (meth)acrylate,
3,4-dihydroxybutyl (meth)acrylate,
2-hydroxyethyl (meth)acrylate, 2-hydroxypropyl (meth)-acrylate;
glycol di(meth)acrylates, such as 1,4-butanediol di(meth) acrylate,
(meth)acrylates of ether alcohols, such as
tetrahydrofurfuryl (meth)acrylate, vinyloxyethoxyethyl (meth)acrylate;
amides and nitriles of (meth)acrylic acid, such as
N-(3-dimethylaminopropyl)(meth)acrylamide,
N-(diethylphosphono)(meth)acrylamide,
1-methacryloylamido-2-methyl-2-propanol;
sulfur-containing methacrylates, such as
ethylsulfinylethyl (meth)acrylate,
4-thiocyanatobutyl (meth)acrylate,
ethylsulfonylethyl (meth)acrylate,
thiocyanatomethyl (meth)acrylate,
methylsulfinylmethyl (meth)acrylate,
bis((meth)acryloyloxyethyl)sulfide;
multifunctional (meth)acrylates, such as
trimethyloylpropane tri(meth)acrylate.

The formulations to be polymerized may also comprise, alongside the (meth)acrylates set out above, further unsaturated monomers copolymerizable with the abovementioned (meth)acrylates. The amount generally used of these compounds is from 0 to 50% by weight, preferably from 0 to 40% by weight and particularly preferably from 0 to 20% by weight, based on the weight of the monomers, and the comonomers here may be used individually or in the form of a mixture.

Among these are, inter alia, 1-alkenes, such as 1-hexene, 1-heptene; branched alkenes, such as
vinylcyclohexane, 3,3-dimethyl-1-propene, 3-methyl-1-diisobutylene, 4-methyl-1-pentene;
acrylonitrile; vinyl esters, such as vinyl acetate;
styrene, substituted styrenes having one alkyl substituent in the side chain, e.g. α-methylstyrene and α-ethylstyrene, substituted styrenes having one alkyl substituent on the ring, e.g. vinyltoluene and p-methylstyrene, halogenated styrenes, such as monochlorostyrenes, dichlorostyrenes, tribromostyrenes, and tetrabromostyrenes;
heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyri-midine, vinylpiperidine, 9-vinylcarbazole, 3-vinylcar-bazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcapro-lactam, N-vinylbutyrolactam, vinyloxolane, vinylfuran, vinylthiophene, vinylthiolane, vinylthiazoles, and hydrogenated vinylthiazoles, vinyloxazoles and hydrogenated vinyloxazoles;
vinyl and isoprenyl ethers;
maleic acid derivatives, such as maleic anhydride,
methylmaleic anhydride, maleimide, methylmaleimide; and dienes, such as divinylbenzene.

The polymerization is generally initiated by known free-radical initiators. Examples of preferred initiators are the azo initiators well known to persons skilled in the art, e.g. AIBN and 1,1-azobis(cyclo-hexanecarbonitrile), and also peroxy compounds, such as methyl ethyl ketone peroxide, acetylacetone peroxide, dilauryl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis (2-ethylhexanoylperoxy)-2,5-dimethylhexane, tert-butylperoxy 2-ethylhexanoate, tert-butylperoxy 3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydro-peroxide, tert-butyl hydroperoxide, bis(4-tert-butyl-cyclohexyl)peroxydicarbonate, mixtures of two or more of the abovementioned compounds with one another, and also mixtures of the abovementioned compounds with compounds not mentioned which can likewise form free radicals.

The amount often used of these compounds is from 0.1 to 10% by weight, preferably from 0.5 to 3% by weight, based on the total weight of the monomers.

Preferred poly(meth)acrylates are obtainable via polymerization of mixtures which comprise at least 20% by weight, in particular at least 60% by weight and particularly preferably at least 80% by weight, of methyl methacrylate, based in each case on the total weight of the monomers to be polymerized.

Use may be made here of various poly(meth)acrylates which differ, for example, in molecular weight or in monomer formulation.

The molding compositions may moreover comprise further polymers in order to modify properties. Among these are, inter alia, polyacrylonitriles, polystyrenes, polyethers, polyesters, polycarbonates and polyvinyl chlorides. These polymers may be used individually or in the form of a mixture, and it is also possible here to add, to the molding compositions, copolymers which are derivable from the abovementioned polymers. Among these are, in particular, styrene-acrylonitrile polymers (SANs), the amount of which added to the molding compositions is preferably up to 45% by weight.

Particularly preferred styrene-acrylonitrile polymers may be obtained via polymerization of mixtures composed of
from 70 to 92% by weight of styrene
from 8 to 30% by weight of acrylonitrile
from 0 to 22% by weight of further comonomers, based in each case on the total weight of the monomers to be polymerized.

In particular embodiments, the proportion of the poly (meth)acrylates is at least 20% by weight, preferably at least 60% by weight and particularly preferably at least 80% by weight.

Particularly preferred molding compositions of this type are available commercially with the trade mark PLEXIGLAS® from Röhm GmbH & Co. KG.

The weight-average molecular weight $\overline{M_w}$ of the homo- and/or copolymers to be used according to the invention as matrix polymers can vary widely, the molecular weight usually being matched to the intended use and the method of processing of the molding composition. However, it is generally in the range from 20 000 to 1 000 000 g/mol, preferably from 50 000 to 500 000 g/mol and particularly preferably from 80 000 to 300 000 g/mol, with no intended resultant restriction.

The following substances were used as colorants:
Cromophtal Brown 5R, Ciba Specialty Chemicals
Sandoplast Red Violet R, Clariant
Thermoplast Blue 684, BASF
Ultramarine Blue 31, Nubiola
Bayferrox 180 M, Bayer
Bayferrox 645 T, Bayer
Microlith Green GA, Ciba speciality Chemicals
Pigment black FW1, Degussa
PK 24-10204, Ferro
PK 10456, Ferro
Titanium dioxide CL 2220, Kronos Coloring of Molding Compositions:

Colorants and molding compositions were homogenized by roll-milling. The formulations for the individual examples have been documented in Table 2. A Plexiglas®GS White 003 sheet (40 mm*21 mm) of thickness 3 mm was also used (see testing of molding compositions). 1.5% of titanium dioxide Cl 2220 is present as colorant, IR-reflective pigment in the cast sheet composed of PMMA.

PLEXIGLAS® 7N provides the residual amounts to give 100% by weight.

TABLE 2

Formulations for Examples and Comparative Examples

| Formulation | Comp. Ex. 1 | Comp. Ex. 2 | Comp. Ex. 3 | Comp. Ex. 4 | Inv. Ex. 1 | Inv. Ex. 2 | Inv. Ex. 3 | Inv. Ex. 4 |
|---|---|---|---|---|---|---|---|---|
| Chromophtal Brown 5R | 0.90% | | | | | | | |
| Sandoplast Red Violet R | 0.17% | | | | | | | |
| Thermoplast Blue 684 | 0.10% | | | | | | | |
| Ultramarine Blue 31 | | 0.65% | | | | | | |
| Bayferrox 180 M | | 0.33% | | | | | | |
| Bayferrox 645 T | | 0.18% | | | | | | |
| Microlith Green GA | | 0.10% | | | | | | |
| Pigment black FW1 | | | 1.00% | | | | | |
| Thermoplast Black X70 | | | | 0.60% | | | | |
| Printex 140 V | | | | 0.09% | | | | |
| PK 24-10204 | | | | | 1% | 0.80% | 0.60% | |
| PK 10456 | | | | | | | | 1% |

Percentage in Table 2 are weight percentages, with ingredients that are present in each individual composition having weight percentages associated with the ingredients. The total weight percentage of each composition in 100 wt. %, with the remaining ingredient Plexiglass ®7N being present in an amount such that the total weight percentages of all ingredients add up to 100 wt %

Testing of Molding Compositions: A press was used to produce pressed plaques of thickness 0.5 mm from the colored molding compositions. The corresponding test specimens were tested by the following methods:

Heating behavior: The specimen of diameter 50 mm and thickness 0.5 mm was placed on a Rohacell® cube of edge length 50 mm. A thermocouple of diameter of 0.5 mm was fixed under the centre of the specimen with Tesa® film. A Plexiglas® GS White 003 sheet (40 mm*21 mm) had been impressed into the Rohacell®. The specimen with thermocouple was secured onto this using double-sided-adhesive Tesa® Fotostrip. The specimen was irradiated using a 60 W incandescent lamp regulated with 220 V (AC voltage stabilizer). Vertical distance between lower edge of glass bulb and specimen 50 mm. The temperature was read off after 20 minutes of irradiation. Heating was measured by a method based on the standard ASTM D4803-97.

Light reflectance: Spectra measured on Perkin Elmer Lambda 19. For this, the specimens were measured with and sometimes without the Plexiglas GS White 003 sheet of thickness 3 mm.

The results for heating behavior of the test specimens can be seen in Table 3.

TABLE 3

Heating behavior of Examples and Comparative Examples.

| SPECIMEN | L* value D65/10; reflection; heating; CieLab | a* value D65/10; reflection; heating; CieLab | b* value D65/10; reflection; heating; CieLab | Temperature after irradiation. Measurement using NiCr—Ni thermocouple of diameter 0.5 mm with Testo 950 Indicator | | |
|---|---|---|---|---|---|---|
| | | | | D65/10; reflection; heating; CieLab [° C./20 min] | D65/10; reflection; heating; CieLab [° C.] | D65/10; reflection; heating; CieLab [° C.] |
| Comparison 1 (brown, organic, IR-transparent) | 30.1 | 3.3 | 4.1 | 31.0 | 55.0 | 24.0 |
| Comparison 2 (brown, inorganic, IR-absorbent) | 28.2 | 3.4 | 1.9 | 35.1 | 57.3 | 22.2 |
| Inventive example 1 (brown) | 28.3 | 4.5 | 2.2 | 29.4 | 53.3 | 23.9 |
| Inventive example 2 (brown) | 27.2 | 3.9 | 1.8 | 32.3 | 56.0 | 23.7 |
| Inventive example 3 (brown) | 27.7 | 4.0 | 1.9 | 31.7 | 55.6 | 23.9 |
| Comparison 3 (black, inorganic, IR-absorbent) | 24.3 | 0.0 | −0.8 | 43.8 | 67.7 | 23.9 |
| Comparison 4 (black, inorganic, IR-absorbent) | 24.0 | −0.1 | −0.9 | 42.8 | 66.8 | 24.0 |
| Example 4 (black) | 26.1 | 1.3 | 0.6 | 37.4 | 61.4 | 24.0 |

The reflectance spectra can be seen in Table 3 (brown colours with Plexiglas GS White 003 sheet of thickness 3 mm), Table 4 (black colours with Plexiglas GS White 003 sheet of thickness 3 mm), and Table 5 (brown colours without Plexiglas GS White 003 sheet of thickness 3 mm).

The examples clearly reveal the improvements achieved via the invention described here:

Table 2 shows that the heating rate for the inventive brown pressed plaques (inventive Examples 1, 2, 3) is better than comparison 2 (brown pressed plaques produced using an inorganically IR-absorbent colorant) and comparable with comparison 1 (colorant used here being IR-transparent-IR reflection taking place at the white Plexiglas GS sheet). From the inventive black pressed plaques (inventive Example 4), it can also be seen that the heating rate here is clearly better (lower) than for comparisons 3 and 4.

Table 3 and 4 clearly show that, based on the respective shade, the inventive pressed plaques clearly reflect IR light (wavelength >700 mm) better than the comparisons. Comparison 1 is an exception here—however, the reflection here takes place at the white Plexiglas® GS sheet.

Table 5 clearly shows that even without the underlying Plexiglas® GS sheet, the inventive brown pressed plaques clearly reflect the IR light better than the comparisons.

The invention claimed is:

1. A method of preparing an opaquely dark-colored molding composition, the method comprising
polymerizing a formulation to form the dark-colored molding composition; wherein the formulation comprises:
(a) a methyl (meth)acrylate monomer; and
(b) an IR-reflective pigment present in the amount of 0.05 to 5% by weight of the molding composition and which is selected from the group consisting of cobalt titanite green spinel having the CAS Number 68186-85-6, chromium oxide having the CAS Number 68909-79-5, iron chromite brown spinel having the CAS Number 68187-09-7, chromium iron oxide having the CAS Number 109414-04-2, nickel iron chromite black spinel having the CAS Number 71631-15-7, and combinations thereof; and
wherein the dark-colored molding composition exhibits a heating rate increase of less than 50° C./20 min irradiation, wherein the opaquely dark colored molding composition has a Cielab L* value below 41.

2. The method of preparing the opaquely dark-colored molding composition according to claim 1, wherein the dark-colored molding composition exhibits a heating rate increase of less than 45° C./20 min when the molding composition is subjected to irradiation.

3. The method of preparing the opaquely dark-colored molding composition according to claim 1, wherein the dark-colored molding composition exhibits a heating rate increase of less than 40° C./20 min when the molding composition is subjected to irradiation.

4. The method of preparing the opaquely dark-colored molding composition according to claim 1, wherein the dark-colored molding composition further comprises:
(c) a mixture comprising:
(i) from 70 to 92% by weight, based on the total weight of the mixture, of styrene;
(ii) from 8 to 30% by weight, based on the total weight of the mixture, of acrylonitrile; and
(iii) optionally from 0 to 22% by weight, based on the total weight of the mixture, of a material selected from the group consisting of a monomer, an inorganic pigment, and combinations thereof.

5. The method of claim 1, wherein the molding composition comprises the IR-reflective pigment cobalt titanite green spinel having the CAS Number 68186-85-6.

6. The method of claim 1, wherein the molding composition comprises the IR-reflective pigment chromium oxide having the CAS Number 68909-79-5.

7. The method of claim 1, wherein the molding composition comprises the IR-reflective pigment iron chromite brown spinel having the CAS Number 68187-09-7.

8. The method of claim 1, wherein the molding composition comprises the IR-reflective pigment chromium iron oxide having the CAS Number 109414-04-2.

9. The method of claim 1, wherein the molding composition comprises the IR-reflective pigment nickel iron chromite black spinel having the CAS Number 71631-15-7.

10. The method of claim 1, wherein the dark-colored molding composition, when irradiated with a 60 W incandescent bulb with a voltage of 220 V, at a distance of 50 mm from the dark-colored molding composition, exhibits a heating rate increase of less than 50° C./20 min when the molding composition is subjected to irradiation.

11. An IR-reflective dark-colored molding composition, the composition comprising:
 (a) polymethyl (meth)acrylate;
 (b) a mixture comprising:
  (i) from 70 to 72% by weight of the molding composition of polystyrene;
  (ii) from 8 to 30% by weight of the molding composition of polyacrylonitrile;
  (iii) optionally from 0 to 22% by weight of the molding composition of one or more copolymers;
 and
 (c) an IR-reflective pigment selected from the group consisting of cobalt titanite green spinel having the CAS Number 68186-85-6, chromium oxide having the CAS Number 68909-79-5, iron chromite brown spinel having the CAS Number 68187-09-7, chromium iron oxide having the CAS Number 109414-04-2, nickel iron chromite black spinel having the CAS Number 71631-15-7, and combinations thereof,
 wherein the dark-colored molding composition, when irradiated with a 60 W incandescent bulb with a voltage of 220 V, at a distance of 50 mm from the dark-colored molding composition, for 20 minutes, shows a temperature increase of 50° C. or less.

* * * * *

UNITED STATES PATENT AND TRADEMARK OFFICE
CERTIFICATE OF CORRECTION

PATENT NO. : 8,378,021 B2
APPLICATION NO. : 11/720653
DATED : February 19, 2013
INVENTOR(S) : Klaus Schultes et al.

Page 1 of 1

It is certified that error appears in the above-identified patent and that said Letters Patent is hereby corrected as shown below:

On the title page, Item (30), the Foreign Application Priority Data should read:

--(30)    Foreign Application Priority Data

Dec. 1, 2004   (DE) .................................... 10 2004058 083.9--

Signed and Sealed this
Twenty-third Day of April, 2013

Teresa Stanek Rea
*Acting Director of the United States Patent and Trademark Office*